(12) United States Patent
Schick et al.

(10) Patent No.: US 11,032,527 B2
(45) Date of Patent: Jun. 8, 2021

(54) UNMANNED AERIAL VEHICLE SURFACE PROJECTION

(71) Applicant: Intel Corporation, Santa Clara, CA (US)

(72) Inventors: Roman Schick, Krailling (DE); Daniel Pohl, Puchheim (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/143,546

(22) Filed: Sep. 27, 2018

(65) Prior Publication Data
US 2019/0052852 A1    Feb. 14, 2019

(51) Int. Cl.
| | |
|---|---|
| *H04N 9/31* | (2006.01) |
| *B64C 39/02* | (2006.01) |
| *G06T 7/521* | (2017.01) |
| *G06T 5/00* | (2006.01) |
| *G06T 7/593* | (2017.01) |

(52) U.S. Cl.
CPC ......... *H04N 9/3185* (2013.01); *B64C 39/024* (2013.01); *G06T 5/006* (2013.01); *G06T 7/521* (2017.01); *G06T 7/593* (2017.01); *H04N 9/3173* (2013.01); *H04N 9/3194* (2013.01); *B64C 2201/123* (2013.01); *G06T 2207/10021* (2013.01); *G06T 2207/10028* (2013.01); *G06T 2207/10032* (2013.01)

(58) Field of Classification Search
CPC .. H04N 9/3185; H04N 9/3173; F04N 9/3194; B64C 39/024; B64C 220/123; G06T 7/521
See application file for complete search history.

(56) References Cited

U.S. PATENT DOCUMENTS

| | | | | |
|---|---|---|---|---|
| 6,715,888 | B1* | 4/2004 | Raskar | H04N 9/3185 348/E9.027 |
| 9,409,645 | B1* | 8/2016 | Sopper | B64C 39/024 |
| 2012/0182416 | A1* | 7/2012 | Kawaguchi | H04N 9/3185 348/128 |
| 2013/0162607 | A1* | 6/2013 | Ichieda | G06F 3/0425 345/204 |

(Continued)

OTHER PUBLICATIONS https://en.wikipedia.org/wiki/Projection_mapping, 5 pages, downloaded on Sep. 24, 2018.

*Primary Examiner* — Michelle M Iacoletti
*Assistant Examiner* — Danell L Owens
(74) *Attorney, Agent, or Firm* — Viering, Jentschura & Partner mbB

(57) ABSTRACT

Herein is disclosed an unmanned aerial vehicle comprising a memory, configured to store a projection image; an image sensor, configured detect image data of a projection surface within a vicinity of the unmanned aerial vehicle; one or more processors, configured to determine a depth information for a plurality of points in the detected image data; generate a transformed projection image from a projection image by modifying the projection image to compensate for unevenesses in the projection surface according to the determined depth information; and send the transformed projection image to an image projector; and an image projector, configured to project the transformed projection image onto the projection surface.

20 Claims, 10 Drawing Sheets

(56) References Cited

U.S. PATENT DOCUMENTS

| | | | |
|---|---|---|---|
| 2014/0078264 A1* | 3/2014 | Zhang | G01B 11/2513 348/47 |
| 2014/0316616 A1* | 10/2014 | Kugelmass | G05D 1/101 701/8 |
| 2017/0261846 A1* | 9/2017 | Maes | H04N 9/3161 |
| 2019/0135450 A1* | 5/2019 | Zhou | G08B 7/066 |

* cited by examiner

UNMANNED AERIAL VEHICLE SURFACE PROJECTION

TECHNICAL FIELD

Various embodiments relate generally to projection of images on uneven surfaces from unmanned aerial vehicles ("UAV").

BACKGROUND

Before ground can be broken on a construction project, several preliminary measurement and planning steps are required. Among these are painstaking surveying procedures, which ensure proper location of construction elements, such as foundations, walls, buildings, sanitation elements, and the like. The necessary measurements may require a geological survey, in which the construction site is mapped. This procedure may consume many man-hours and accounts for a substantial portion of construction time and cost.

SUMMARY

Herein is disclosed an unmanned aerial vehicle comprising a memory, configured to store a projection image; an image sensor, configured detect image data of a projection surface within a vicinity of the unmanned aerial vehicle; one or more processors, configured to determine a depth information for a plurality of points in the detected image data; generate a transformed projection image from a projection image by modifying the projection image to compensate for unevenesses in the projection surface according to the determined depth information; and send the transformed projection image to an image projector; and an image projector, configured to project the transformed projection image onto the projection surface.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DETAILED DESCRIPTION

Figure 1:
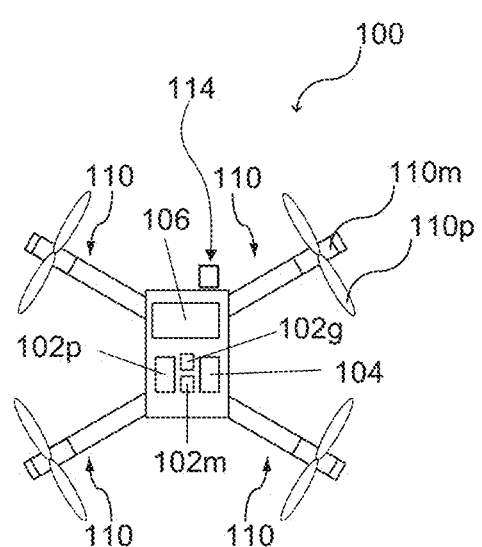
FIG. 1 shows an unmanned aerial the vehicle according to an aspect of the disclosure.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any embodiment or design described herein as "exemplary" is not necessarily to be construed as preferred or advantageous over other embodiments or designs.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "position" used with regard to a "position of an unmanned aerial vehicle", "position of an object", "position of an obstacle", and the like, may be used herein to mean a point or region in a two- or three-dimensional space. It is understood that suitable coordinate systems with respective reference points are used to describe positions, vectors, movements, and the like.

The term "map" used with regard to a two- or three-dimensional map may include any suitable way of describing positions of objects in the two- or three-dimensional space.

According to various aspects, a voxel map may be used to describe objects in the three dimensional space based on voxels associated with objects. To prevent collision based on a voxel map, ray-tracing, ray-casting, rasterization, etc., may be applied to the voxel data.

An unmanned aerial vehicle (UAV) is an aircraft that has the capability of autonomous flight. In autonomous flight, a human pilot is not aboard and in control of the unmanned aerial vehicle. The unmanned aerial vehicle may also be denoted as unstaffed, uninhabited or unpiloted aerial vehicle, -aircraft or -aircraft system or drone.

FIG. 1 illustrates an unmanned aerial vehicle 100 in a schematic view, according to various aspects. The unmanned aerial vehicle 100 may include a plurality of (e.g., three or more than three, e.g., four, six, eight, etc.) vehicle drive arrangements 110. Each of the vehicle drive arrangements 110 may include at least one drive motor 110$m$ and at least one propeller 110$p$ coupled to the at least one drive motor 110$m$. The one or more drive motors 110$m$ of the unmanned aerial vehicle 100 may be electric drive motors.

Further, the unmanned aerial vehicle 100 may include one or more processors 102$p$ configured to control flight or any other operation of the unmanned aerial vehicle 100 including but not limited to navigation, image analysis, location calculation, and any method or action described herein. One or more of the processors 102$p$ may be part of a flight controller or may implement a flight controller. The one or more processors 102$p$ may be configured, for example, to provide a flight path based at least on an actual position of the unmanned aerial vehicle 100 and a desired target position for the unmanned aerial vehicle 100. In some aspects, the one or more processors 102$p$ may control the unmanned aerial vehicle 100. In some aspects, the one or more processors 102$p$ may directly control the drive motors 110$m$ of the unmanned aerial vehicle 100, so that in this case no additional motor controller may be used. Alternatively, the one or more processors 102$p$ may control the drive motors 110$m$ of the unmanned aerial vehicle 100 via one or more additional motor controllers. The one or more processors 102$p$ may include or may implement any type of controller suitable for controlling the desired functions of the unmanned aerial vehicle 100. The one or more processors 102$p$ may be implemented by any kind of one or more logic circuits.

According to various aspects, the unmanned aerial vehicle 100 may include one or more memories 102$m$. The one or more memories may be implemented by any kind of one or more electronic storing entities, e.g. a one or more volatile memories and/or one or more non-volatile memories. The one or more memories 102$m$ may be used, e.g., in interaction with the one or more processors 102$p$, to build and/or store image data, ideal locations, locational calculations, or alignment instructions.

Further, the unmanned aerial vehicle 100 may include one or more power supplies 104. The one or more power supplies 104 may include any suitable type of power supply, e.g., a directed current (DC) power supply. A DC power supply may include one or more batteries (e.g., one or more rechargeable batteries), etc.

According to various aspects, the unmanned aerial vehicle 100 may include one or more sensors 106. The one or more sensors 106 may be configured to monitor a vicinity of the unmanned aerial vehicle 100. The one or more sensors 106 may be configured to detect obstacles in the vicinity of the unmanned aerial vehicle 100. The one or more sensors 106 may include, for example, one or more cameras (e.g., a depth camera, a stereo camera, a thermal imaging camera, etc.), one or more ultrasonic sensors, etc. The unmanned aerial vehicle 100 may further include a position detection system 102g. The position detection system 102g may be based, for example, on Global Positioning System (GPS) or any other available positioning system. Therefore, the one or more processors 102p may be further configured to modify the flight path of the unmanned aerial vehicle 100 based on data obtained from the position detection system 102g. The sensors 106 may be mounted as depicted herein, or in any other configuration suitable for an implementation.

According to various aspects, the one or more processors 102p may include at least one transceiver configured to provide an uplink transmission and/or downlink reception of radio signals including data, e.g. video or image data and/or commands. The at least one transceiver may include a radio frequency (RF) transmitter and/or a radio frequency (RF) receiver.

The one or more processors 102p may further include an inertial measurement unit (IMU) and/or a compass unit. The inertial measurement unit may allow, for example, a calibration of the unmanned aerial vehicle 100 regarding a predefined plane in a coordinate system, e.g., to determine the roll and pitch angle of the unmanned aerial vehicle 100 with respect to the gravity vector (e.g. from planet earth). Thus, an orientation of the unmanned aerial vehicle 100 in a coordinate system may be determined. The orientation of the unmanned aerial vehicle 100 may be calibrated using the inertial measurement unit before the unmanned aerial vehicle 100 is operated in flight modus. However, any other suitable function for navigation of the unmanned aerial vehicle 100, e.g., for determining a position, a flight velocity, a flight direction, etc., may be implemented in the one or more processors 102p and/or in additional components coupled to the one or more processors 102p.

The unmanned aerial vehicle 100 may further be equipped with one or more lasers or projectors 114, which are configured to project a projection image onto a projection surface. The one or more lasers or projectors 114 may be mounted in or on any portion of the unmanned aerial vehicle 100. The one or more lasers or projectors 114 may operate using any known technology to project any wavelength of light, or any range or ranges of wavelengths of light, onto a surface. The projection may be of any color or colors. The projection may be monochrome or multicolored.

Traditional preparation for construction may require a lengthy period of surveying, which is typically performed by using ground-based surveying equipment across an area of construction, followed by coordination with GPS coordinates. Part of the difficulty of traditional surveying methods may be simplified by projecting a construction plan on the construction site from above. However, because the construction site is unlikely to be perfectly flat, unevenness of the projection surface may distort the resulting projection. Because the projection would become a basis for planning a construction site, such distortions may create undesirable errors within the construction area. In order to eliminate said errors, the projection image may require modification to accommodate an unevenness of the projection surface.

Figure 2:
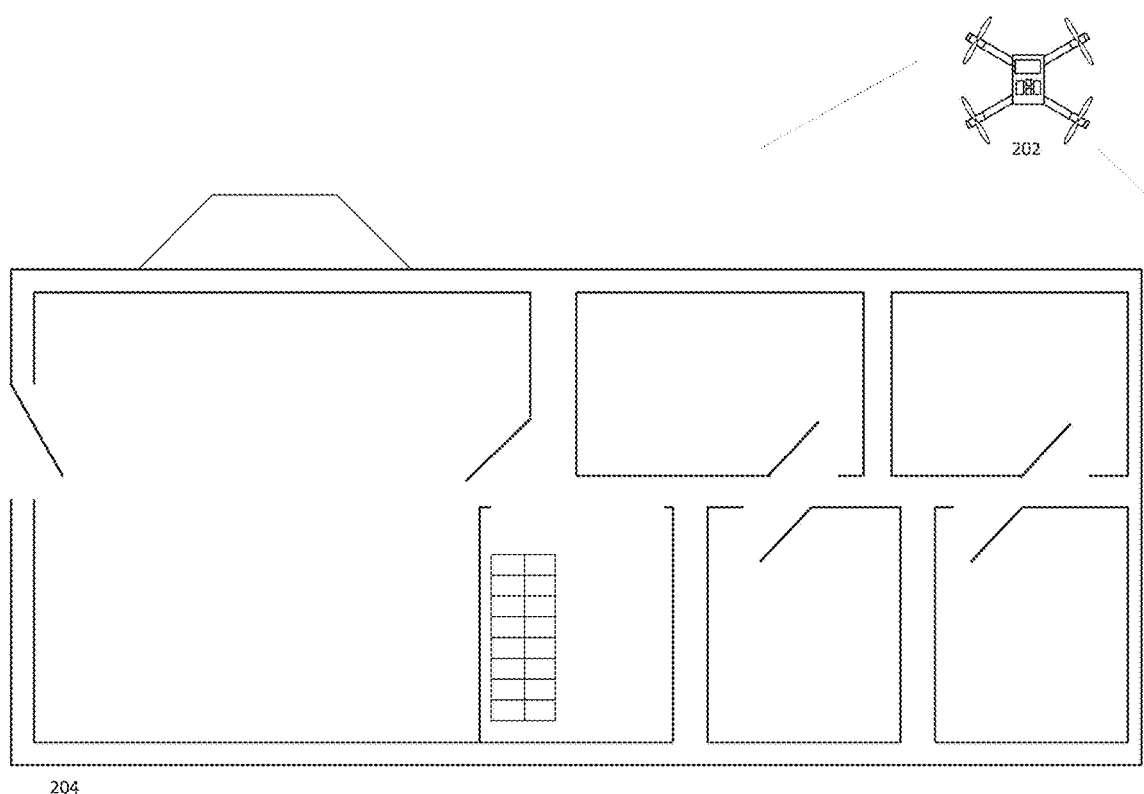
FIG. 2 shows an unmodified or undistorted projection image.

FIG. 2 shows a projection of a construction plan on a surface by an unmanned aerial vehicle. One or more unmanned aerial vehicles 202 may be preconfigured with one or more projection images for projection onto a projection surface. In this case, the projection surface may be the ground, or any other surface on which projection is desired. The unmanned aerial vehicle 202 may be configured with a projection device, whether one or more lasers, or otherwise. The unmanned aerial vehicle 202 may use the projection device, such as the lasers, to project the projection image onto the projection surface, thereby creating a visible representation of the projection image 204 on the projection surface. With respect to a construction project, the unmanned aerial vehicle 202 may be configured with a floor plan, architectural plan, construction plan, or other representation of a construction project, for projection onto the projection surface. In this case, the image 204 is selected to represent a construction plan of a simple building, which is then projected onto the projection surface, for use in marking the proper areas for construction to proceed. The unmanned aerial vehicle 202 may be configured with a position location sensor, including, but not limited to, a GPS sensor, which may be configured to determine a position of the unmanned aerial vehicle 202. The unmanned aerial vehicle 202 may be configured to project the projection image from a predetermined location, and the unmanned aerial vehicle may rely on the position sensor to reach the predetermined location from which the image is projected. The unmanned aerial vehicle may be equipped with additional position sensors, such that the unmanned aerial vehicle is capable of determining a position based on any combination of position sensors, including global positioning system, Galileo, wireless telecommunication positioning technology, real-time kinematic positioning, or otherwise.

Figure 3:
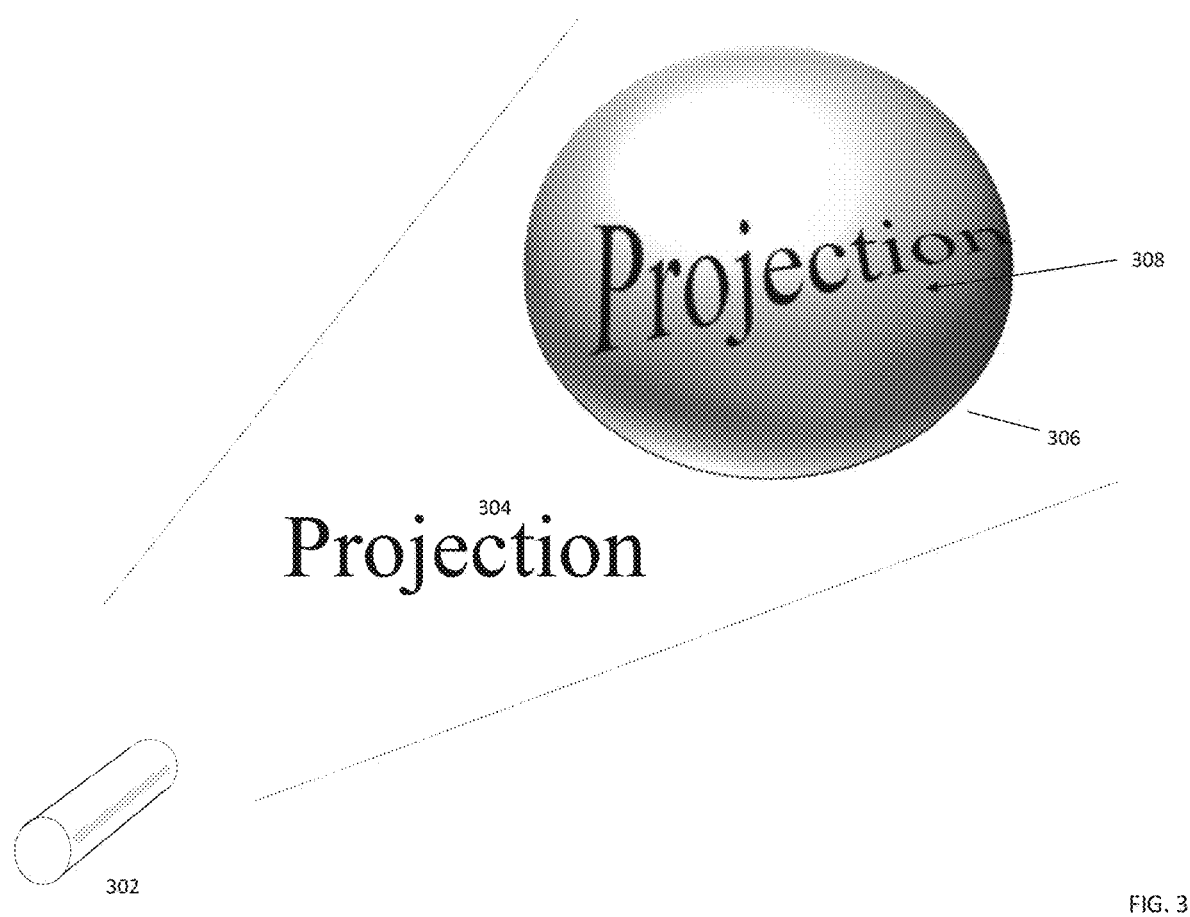
FIG. 3 shows an unmodified or undistorted projection image projected onto an uneven surface.

FIG. 3 shows a projection of an unmodified projection image on an uneven surface, according to an aspect of the disclosure. In this figure, a laser 302 is configured to project a projection image 304 onto an uneven surface 306. For demonstrative purposes, the word "projection" is used as the projection image. The projection image 304 in this example is a standard font of uniform size, with letters arranged along a horizontal line. The projection surface 306 is a rounded shape, which thereby has an uneven (not flat) surface. When the projection image 304 is projected onto the uneven surface 306, the projection image is distorted, as can be seen in 308. This may be unsuitable for applications requiring a high degree of projection precision. For example, an attempt to project a construction plan onto the ground, where the projected plan is distorted as shown in FIG. 3, may be unacceptable.

Figure 4:
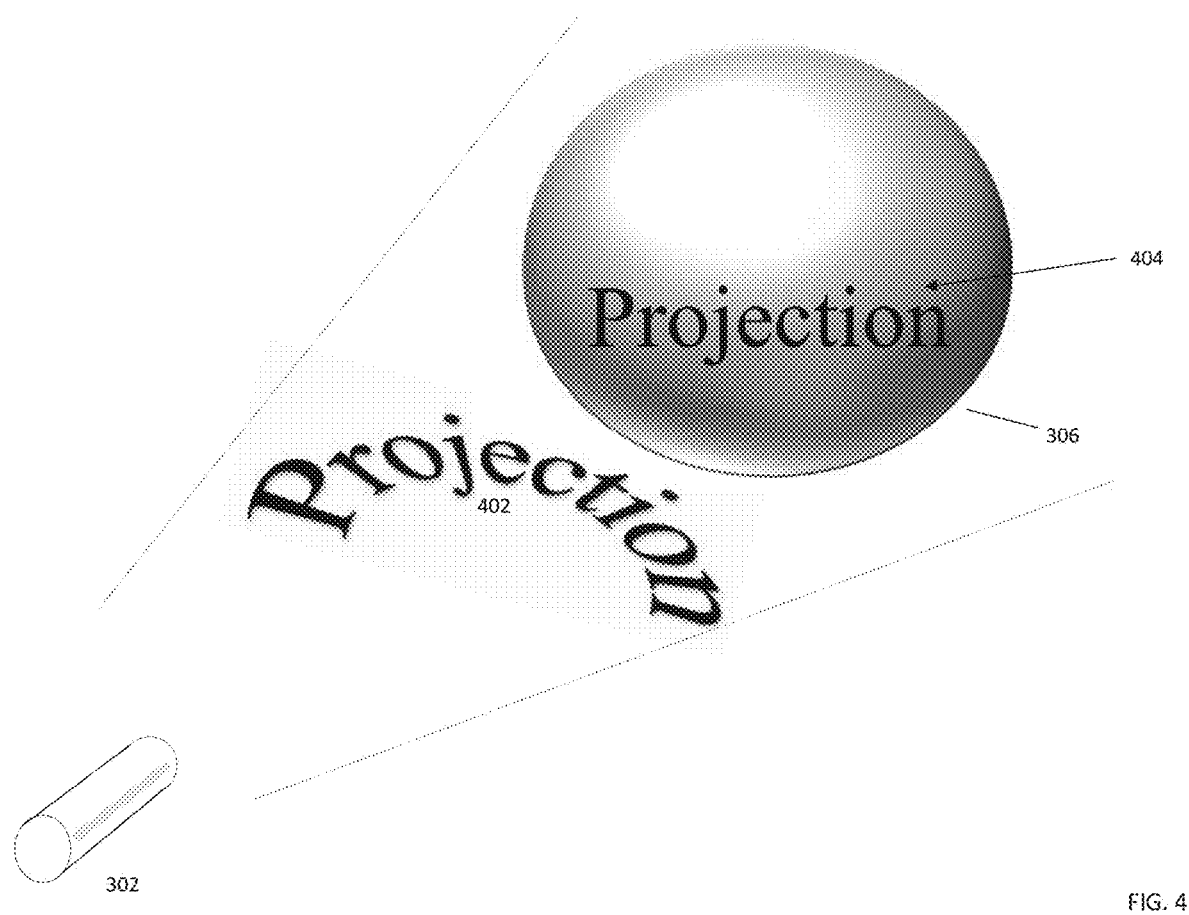
FIG. 4 shows a modified or distorted projection image projected onto an uneven surface.

FIG. 4 shows a projection of a modified projection image on an uneven surface, according to another aspect of the disclosure. In this example, the laser projector 302 is configured to project a modified projection image 402 on an uneven surface 306. The projection image 402 is modified to account for a curvature or unevenness of the projection surface 306. By modifying the projection image 402 to account for an unevenness of the projection surface 404, the modified projection image 402 may be projected on to the projection surface 306 in such a way that the modified projection image 402 on the projection surface 306 generally appears as an unmodified projection image 404. In this case, the word "projection" has been modified 402 to account for a curvature of the projection surface. By performing this modification, the word "projection" appears normal against the uneven surface, showing essentially regularly spaced letters along a horizontal line, when viewed on the uneven projection surface 306. The process of modifying a projection image for projection onto an uneven surface may be known as "projection mapping". The modification of the projection image may be carried out according to any known projection mapping technique, or any other technique for projecting an image onto an uneven surface.

The unmanned aerial vehicle may be configured with one or more image sensors, and may be configured to utilize data from the one or more image sensors to construct an image of a projection surface with corresponding depth information. The UAV may be configured to take a plurality of images of the projection surface from a variety of at least one of altitudes, directions, and angles. The images may include less than the entire area of the projection surface. The images may include overlapping areas. The one or more image sensors may be configured to deliver the multiple images of the projection surface to one or more processors, which may be configured to generate from the multiple images of the projection surface a single image with depth information. The one or more processors may be configured to generate depth information from the multiple images using any known technology. According to one aspect of the disclosure, the one or more processors may generate depth information from multiple images using a 3D modeling software program and/or a program for 3D reconstruction.

Figure 5:
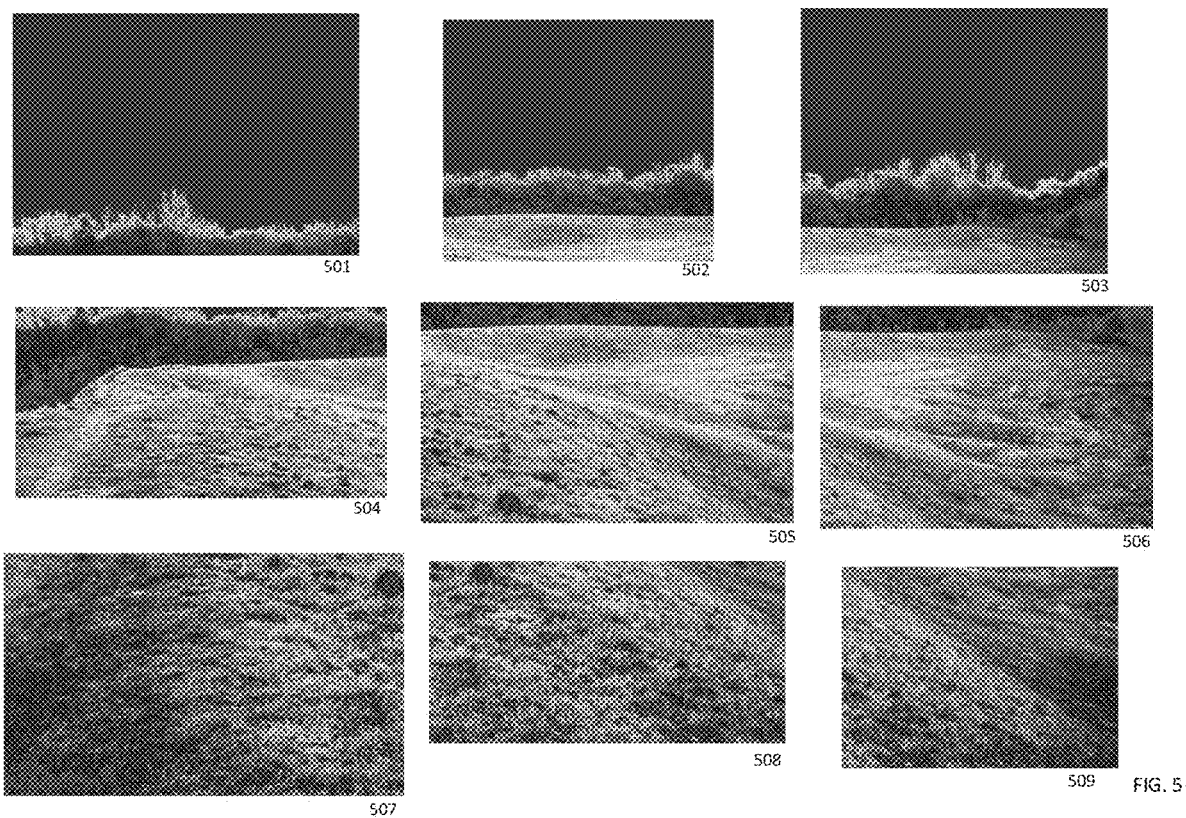
FIG. 5 shows a demonstrative sample of aerial images from an unmanned aerial vehicle covering various portions of a projection surface.

FIG. 5 depicts a first portion of the projection surface depth generation, as disclosed herein. According to this aspect of the disclosure, the UAV may obtain a variety of images of the projection surface, as depicted in 501-509. Any one image may include an entirety of the projection surface or, as depicted herein, less than the entirety of the projection surface. The images may be taken from a variety of altitudes, angles, and/or headings. The images may include overlapping portions. According to one aspect of the disclosure, the UAV may be configured with predetermined coordinates of a projection surface, and the UAV may be configured to obtain images of the projection surface from an area above or near the projection surface. The UAV may be programmed to obtain a predetermined number of images, programmed to obtain images for predetermined length of time, programmed to ensure image data from an entirety of the projection surface, or any other means to obtain image data of the projection surface.

It is contemplated that a projection surface area may be so large as to exceed the ability of the UAV's image sensor to obtain image data, based at least on a distance between the image sensor and the projection surface, and a focal length of a lens corresponding to the image sensor. Otherwise stated, given a particular altitude of the UAV, and given a configuration of the image sensor, the image sensor may be unable to detect image data from an entirety of a projection surface. Accordingly, the UAV may be configured to synthesize projection surface data from a plurality of projection surface images. The nine images of a projection surface 501-509, taken at varying vantages, each show less than an entirety of the projection surface. The image sensor may be configured to transmit image sensor data of the various images 501-509 to one or more processors, which may be configured to employ an image synthesis algorithm to combine the images into a single image of the projection surface. This may be achieved using any known technology.

The one or more processors may be configured to analyze the multiple images of the projection surface, or a synthesized image of the projection service, to determine depth information. Various known techniques and software programs permit the generation of depth information from one or more two-dimensional images. The creation of depth information of the projection service may be carried out according to any such programs, whether 3D modeling programs, one or more programs for 3D reconstruction, or otherwise, and whether programs designed to generate depth information from a single image, or from a plurality of images. The generated three-dimensional information may be any format capable of carrying depth information without limitation, including, but not limited to, a three dimensional map, a point cloud, a voxel map, or otherwise. According to one aspect of the disclosure, the one or more processors may be configured to determine depth information of the projection surface as described above and, using the determined depth information, mark corresponding surface features of a projection and map them to the projection surface according to the desired position and known three dimensional geometrical shape of the projection surface. Projection mapping technologies continue to develop and improve, and it is anticipated that a variety of projection mapping options may be available. The methods and principles described herein may be performed by any known method of projection mapping that is capable of modifying the projection image so as to appear unmodified or undistorted on a complex geometry of a projection surface, using the determined depth information as described herein.

In the case that a voxel map is used to determine or store depth information, the voxel may be used according to any known method to obtain information regarding the height or shape of the projection surface. The one or more processors may be configured to implement any known voxel map technology including a voxel map technology as used for unmanned aerial vehicle collision avoidance.

Figure 6:
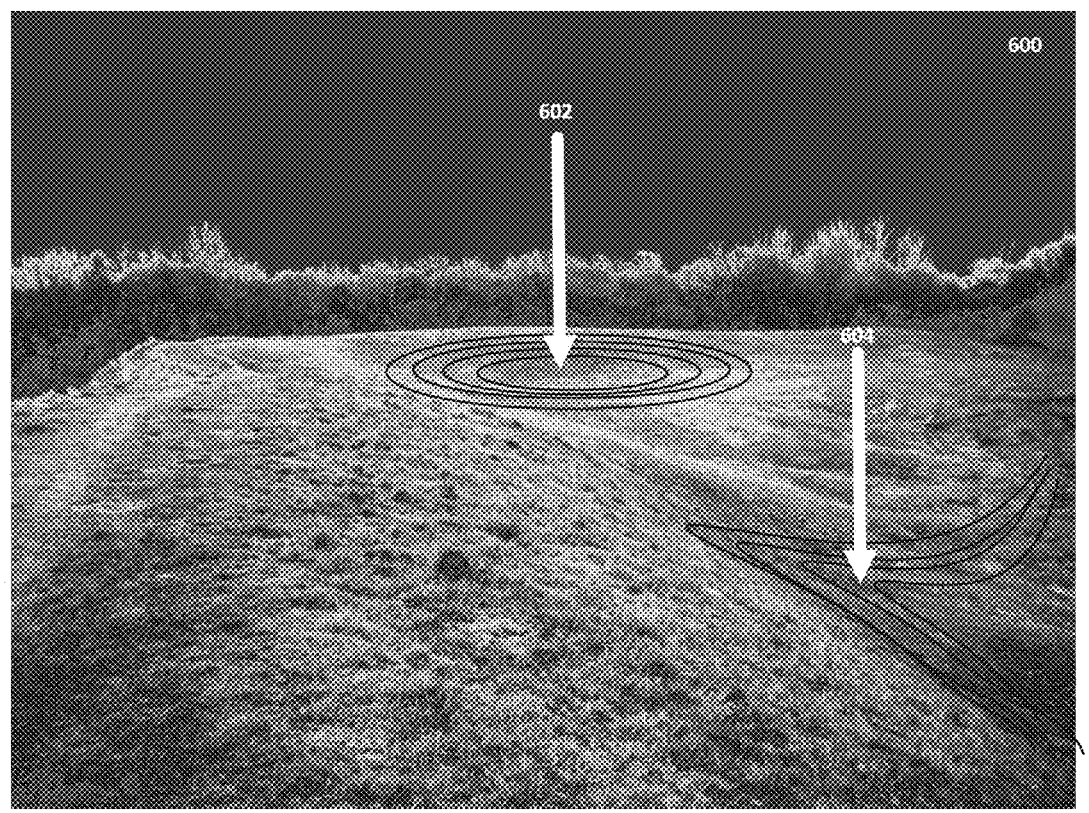
FIG. 6 depicts a depth analysis of the projection surface based on the aerial images according to an aspect of the disclosure.
Figure 7:
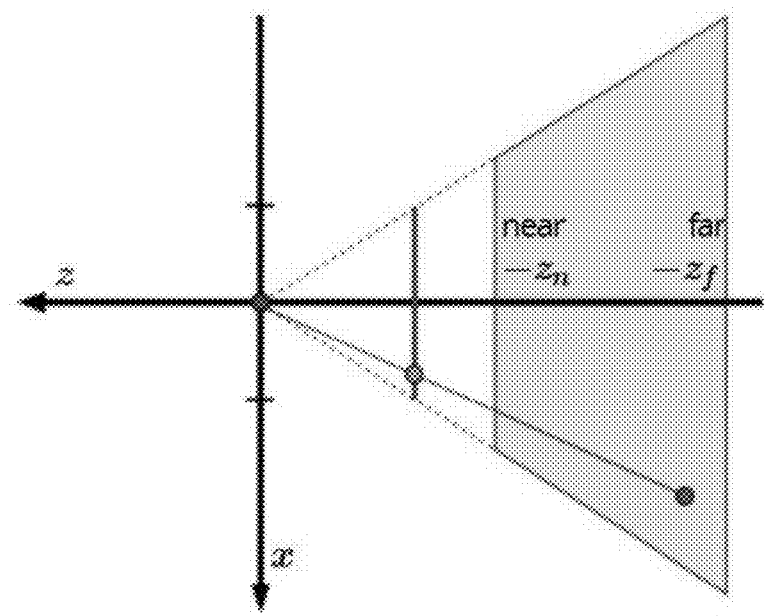
FIG. 7 demonstrates an aspect of image depth analysis, according to another aspect of the disclosure.

In FIG. 6, a reconstructed image of the projection surface 600 is analyzed to determine depth information, as depicted by a recessed area 602 or a sloped area 604. The concentric lines depicted herein may be one method of indicating a depth information, but are depicted principally for demonstrative purposes and should not be understood as limiting the method of depth information depiction. FIG. 7 depicts an application of depth information determination using multiple images, according to one aspect of the disclosure. In this figure, pixels or elements of images are compared, and distances between the camera and said pixels or elements are estimated.

When depth information of the projection surface is ascertained, the projection image must be modified to accommodate changes in distance between the laser and/or projector and the projection surface. This procedure may be known as projection mapping and may be designed to modify a projection image, such that the modified projection image appears to an observer as an unmodified version of the projection image when projected upon an uneven surface. This may be achieved with any known method of image modification for projection mapping. According to one aspect of the disclosure, this may be achieved by applying a projection matrix to the projection image.

The projection image modification may include a geometric calibration step, wherein an undistorted or unmodified image is modified or distorted to appear undistorted when projected onto a geometrically complex surface. The projection image modification may further include a color calibration step, wherein the projection image is modified to maintain visibility based on a color of the projection surface.

Figure 8:
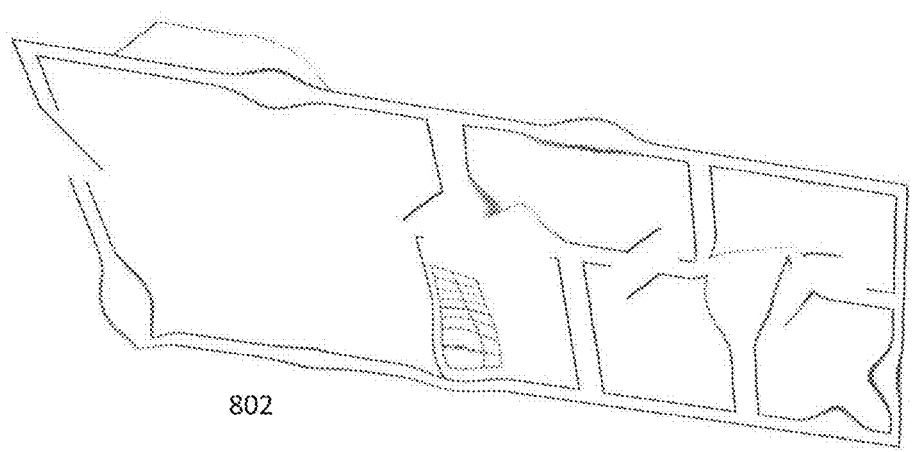
FIG. 8 depicts a modified or distorted projection image according to an uneven projection surface.

FIG. 8 shows a distortion of a projection image according to derived depth information of the projection surface. As shown for demonstrative purposes, image 802 in FIG. 8 is a distorted representation of the projection image 204 depicted in FIG. 2, according to a projection mapping procedure. As demonstrated herein, the one or more processors may be configured to perform one or more projection mapping operations, such as a geometric calibration step, in which points of the projection image are mapped to corresponding points on the projection surface, and the projection image is modified or distorted to correct for a complex geometry or unevenness in the projection surface. As stated herein, this may be performed using any known projection mapping technique, or any other technique capable of modifying the projection image for projection onto the uneven surface. The mapping of the image to the projection surface may be achieved using one or more location measurements, such as, for example, global positioning system measurements. That is, it may be determined via Global positioning system coordinates, or other location coordinates, where the projection image relative to the earth should be projected, which allows for direct mapping of a portion of the projection image to a corresponding portion of the projection surface. Taking the depth information into account, the projection image may be distorted or modified to account for the uneven surface of the projection surface and thereby perform a projection mapping operation.

Figure 9:
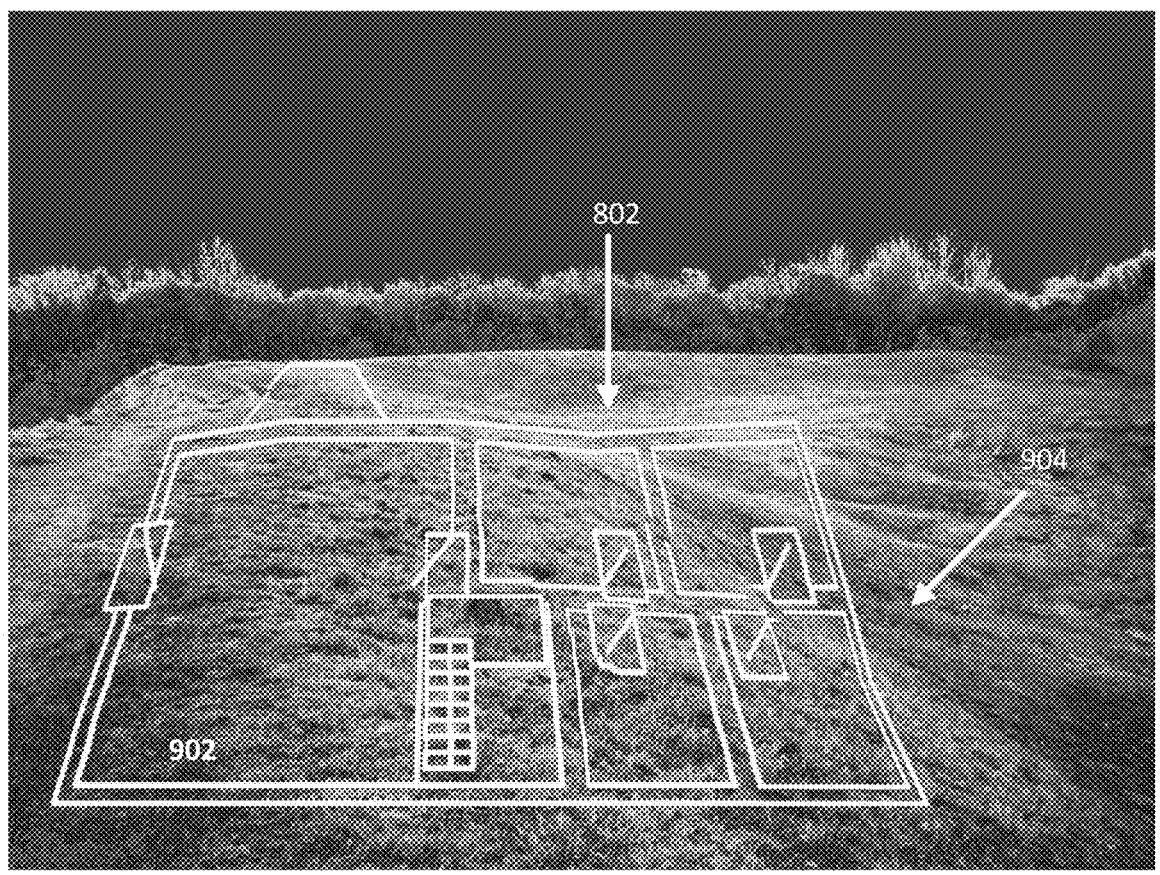
FIG. 9 depicts a projection of a modified or distorted projection image onto an uneven projection surface.

FIG. 9 shows a projection of the modified or distorted projection image 802 onto the projection surface 902, such that the projection image appears undistorted 904.

Figure 10:
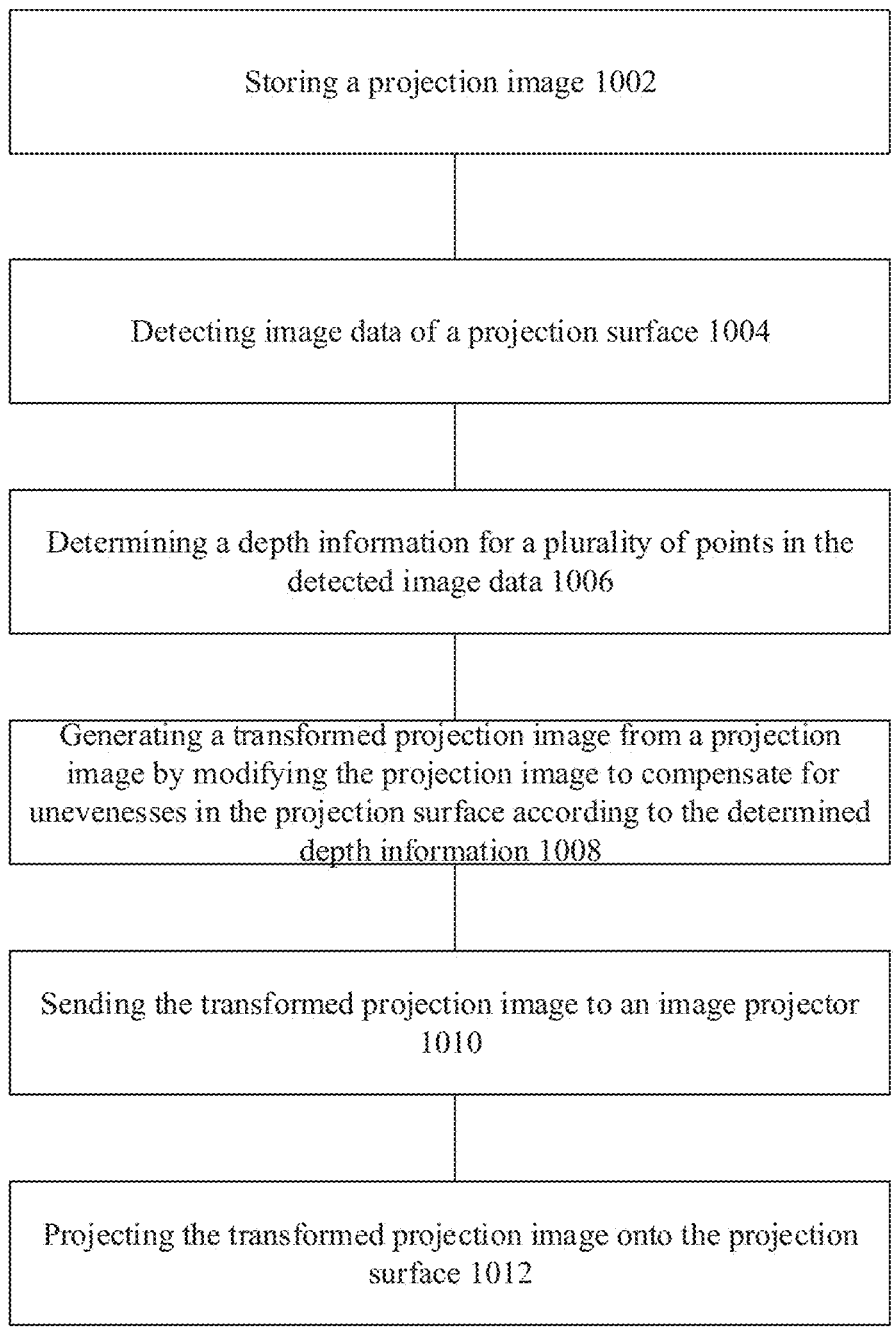
FIG. 10 depicts a method of unmanned aerial vehicle projection, according to an aspect of the disclosure.

In FIG. 10 is depicted a method of unmanned aerial vehicle projection comprising storing a projection image 1002; detecting image data of a projection surface 1004; determining a depth information for a plurality of points in the detected image data 1006; generating a transformed projection image from a projection image by modifying the projection image to compensate for unevenesses in the projection surface according to the determined depth information 1008; sending the transformed projection image to an image projector 1010; and projecting the transformed projection image onto the projection surface 1012.

Figure 11:
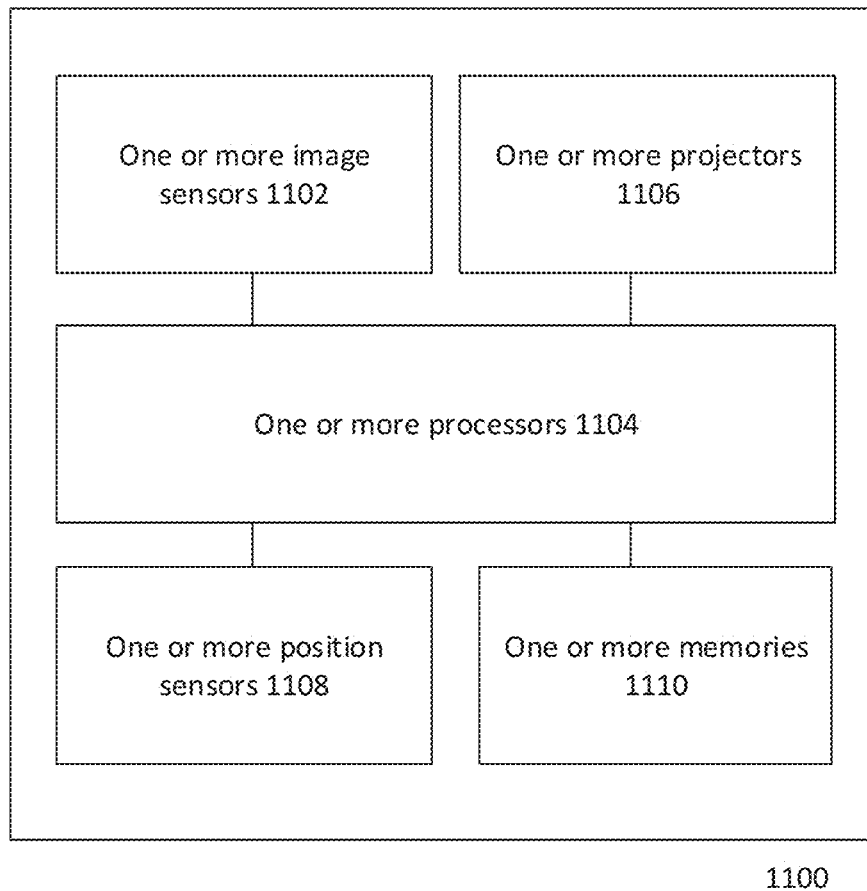
FIG. 11 depicts a configuration of the unmanned aerial vehicle for protection onto an uneven surface, according to an aspect of the disclosure.

FIG. 11 shows a sensor and processor configuration 1100 of the unmanned aerial vehicle according to one aspect of the disclosure. The unmanned aerial vehicle may include one or more image sensors 1102, which are configured to obtain images of a vicinity of the unmanned aerial vehicle, including the projection surface. The unmanned aerial vehicle may further include one or more processors 1104, configured to receive the image data from the one or more image sensors 1102 and to process the image data in accordance with the methods and procedures described herein. According to one aspect of the disclosure, the processing of image data may include combining one or more overlapping images into a single image; mapping image coordinates to geographic locations or GPS locations; determining depth information from a plurality of images; modifying one or more images according to the determined depth information; controlling the one or more projectors and/or causing the one or more projectors to project the modified images; retrieving instructions, geographic coordinates, image data, or any other data from the one or more memories 1110; storing instructions, image data, modified image data, depth information, projection image, or otherwise on the one or more memories 1110; and controlling the unmanned aerial vehicle pursuant to data received from the one or more position sensors.

The unmanned aerial vehicle, according to various aspects, may include a camera gimbal having an independent two- or three-axis degree of freedom to properly track a target, e.g. a person or point of interest, with a tracking camera independently of an actual flight direction or actual attitude of the unmanned aerial vehicle. In some aspects, a depth camera may be used for obtaining images of the projection surface. A depth camera may allow associating depth information with an image, e.g., to provide a depth image. This allows, for example, providing an image of the vicinity of the unmanned aerial vehicle including depth information about one or more objects depicted in the image. As an example, a depth image may include information to indicate a relative distance of objects displayed in the image. This distance information may be, but is not limited to, colors and/or shading to depict a relative distance from a sensor. Based on depth images, a three dimensional map may be constructed from the depth information. Said map construction may be achieved using a depth map engine, which may include one or more processors or a non-transitory computer readable medium configured to create a depth map from the depth information provided by the depth images.

According to another aspect of the disclosure, the one or more image sensors on the UAV may be cameras. This may include cameras configured to take still images or video images. This may further include mono cameras or stereo cameras. That is, the camera may be equipped to take a two dimensional image, which will then be combined with other two-dimensional images from different altitudes, angles, or vantages to construct a three-dimensional image. Alternatively, the cameras may be stereo cameras or depth cameras, which are equipped to take a three-dimensional image or image including depth information. These images with depth information may then be combined with other images to obtain a more accurate three-dimensional image or a three-dimensional image from various vantage points.

According to one aspect of the disclosure, distances between the UAV and the projection surface may be obtained from a depth sensing camera, which may be able to determine a distance between the camera and at least one point in an image received by the camera.

According to another aspect of the disclosure, distances between the UAV and the projection surface may be derived from images obtained by one or more mono-cameras, according to a depth estimation algorithm. The UAV may be equipped with one or more image sensors, which are configured to receive a plurality of images of the projection surface. A 3D representation of the projection surface may be generated based on any 3D image reconstruction technology. The 3D reconstruction technology may be employed to create a point cloud or a point mesh or other 3D data organization scheme representing three-dimensional locations of the UAVs.

The methods and principles described herein may be performed by one or more unmanned aerial vehicles. According to a first aspect of the disclosure, a single unmanned aerial vehicle may be configured to obtain images of the projection surface, calculate depth information from the obtained pictures, modify or distort the projection image according to the calculated depth information, and project the distorted image onto the projection surface. According to a second aspect of the disclosure, the methods and principles described herein may be performed by a plurality of unmanned aerial vehicles. It is contemplated that the tasks described herein, such as, for example, obtaining images of the projection surface, calculating depth information from the obtained images, modifying or distorting a projection image based on the calculated depth information, and projecting the modified or distorted projection image, may be performed in any combination by one or more unmanned aerial vehicles. That is, a plurality of unmanned aerial vehicles may be tasked with obtaining images, but only a single unmanned aerial vehicle may project an image. Alternatively, multiple unmanned aerial vehicles may project an image, while only a single unmanned aerial vehicle obtains images of the projection surface. In essence, each task may be divided among one or more unmanned aerial vehicles, as is appropriate for a given installation.

At least one unmanned aerial vehicle will be equipped with a projector. The projector may be any projector including a laser projector. The projector may be monochrome or multicolored. As stated above, the modified projection image may be projected by a single unmanned aerial vehicle, or by a plurality of unmanned aerial vehicles. In circumstances when the projection image is a construction drawing, such as a computer aided design drawing of a construction plan, a laser projector may be desirable.

The area of the projection surface must be correlated with location information, such as a one or more global positioning system coordinates. In the case of a construction project many construction projects are routinely configured with global positioning system information, and therefore the principles and methods described herein may utilize pre-existing global positioning coordinates from the construction plan itself.

Knowing the corresponding position coordinates, one or more unmanned aerial vehicles may be programmed to fly in the vicinity of the positioning coordinates and to obtain images of the ground area corresponding to the GPS coordinates. The images may be taken of an area roughly corresponding to the GPS coordinates, such that the images include an area greater than the GPS coordinates. The images may include a plurality of images of any given area. The plurality of images may be taken from multiple locations, angles, advantages, altitudes, etc. Although there may be no static number of desired images of the projection surface, each portion of the projection surface should be contained in at least one image. By having each area of the projection surface within at least two images, wherein said at least two images are taken at least from a different position or a different angle, greater depth information accuracy may be attainable.

The plurality of images of the projection surface may be processed by one or more 3D reconstruction software programs. A variety of programs are known to process a plurality of images to obtain three-dimensional or depth information, and any program capable of achieving this aim may be acceptable for this purpose. Depending on the camera or cameras used, and the size of the projection surface area, it may be impossible or undesirable to capture an entirety of the surface area within a single image. Where this is the case, multiple images of the surface area may be stitched or joined together for depth information analysis. A variety of software programs are available for this purpose, and any such software program may be used, provided that said software program is capable of joining or stitching a plurality of overlapping images into a single image. The step of combining multiple overlapping images may be performed prior to calculating 3D depth information, after calculating 3D depth information, or concurrently with calculating 3D depth information.

Using the calculated 3D depth information, the one or more processors may be configured to construct a 3D model of the projection surface. The 3D model may be in any known form, whether a 3D image, a point map, a point cloud, a voxel map, or otherwise. The 3D model may take into account and display unevenness or geometric complexity within the projection surface area. That is, unevenness within the projection surface area may correspond with changes in distance between the projection surface area and the camera of the unmanned aerial vehicle, such that recessed areas have a greater than average distance, and protrusions (such as trees rocks, and buildings, etc.) have a shorter than average distance between the surface and the unmanned aerial vehicle camera. The 3D model may depict any unevenness in the projection surface, whether due to changes in height of the ground, objects on the ground, vegetation, buildings, people, or otherwise.

According to one aspect of the disclosure, the one or more unmanned aerial vehicles may be configured to perform the above-described image manipulation and depth calculation using one or more processors within the unmanned aerial vehicle. This may be performed by a single unmanned aerial vehicle, whether operating alone or with any swarm, or it may be performed by a plurality of unmanned aerial vehicles, which are configured to share information and processing results. Alternatively, the images of the projection surface may be wirelessly transmitted to a server or other processor external to the one or more unmanned aerial vehicles, said server or processor manipulating the images as described above and calculating depth information. In this configuration, said server processor may wirelessly transmit a 3D model to the one or more unmanned aerial vehicles for projection image modification.

Once the depth information is obtained, the projection image is modified to account for unevenness in the projection surface. This may be performed according to any known method capable of modifying an image for projection onto an irregular surface, including, but not limited to, a known projection mapping method. Such a modification may take into account differences in distance between a projection surface and the projector. Such differences in distance may be due to, for example, changes in elevation, irregularities of a ground surface area, vegetation, buildings, minerals or mineral deposits, or otherwise. The image modification taking into account the depth information may be performed such that the modified projection image, when projected onto irregular projection surface area, appears to a viewer as the unmodified projection image may appear on a flat surface. That is, the projection images modified to account for unevenness within the projection surface.

Although a variety of methods for modifying the projection image may be possible, the projection image may be modified according to a perspective projection matrix. According to one aspect of the disclosure, the perspective projection matrix may be as follows:

$$\tilde{P} = \underbrace{\begin{bmatrix} f & 0 & 0 & 0 \\ 0 & f & 0 & 0 \\ 0 & 0 & \frac{z_f + z_n}{z_n - z_f} & \frac{2z_f z_n}{z_n - z_f} \\ 0 & 0 & -1 & 0 \end{bmatrix}}_{A} \begin{pmatrix} p_x \\ p_y \\ p_z \\ 1 \end{pmatrix} \quad (1)$$

wherein $z_f$ refers to far values along the z-axis and $z_n$ refers to near values along the z-axis. A person skilled in the art will appreciate that a variety of perspective projection matrix formulations are possible, and that the projection image modification is not limited to the calculations contained in the matrix of formula 1.

The modification of the projection image may require coordination of a portion of the projection image with a corresponding portion of the projection surface. According to one aspect of the disclosure, this may be achieved using at least global positioning system data. That is, the projection image may be coordinated with or mapped to global positioning data, or any other kind of positioning data, such that a given point or area of the projection image can be coordinated with a corresponding geographic location. By linking a portion of the image to a corresponding location, the portion of the image may be modified or distorted to account for an unevenness in the corresponding geographic location.

According to one aspect of the disclosure, the position determination, position mapping, or other position coordination as described herein may be performed using the global positioning system, or any other positioning system. According to an aspect of the disclosure, the global positioning system information accuracy may be improved by implementing an additional technique, such as real-time kinematic processing of global positioning system information. Any two positioning system techniques may be improved for greater accuracy, such as combining a wireless radio access communication positioning technology with a global positioning system technology, or otherwise.

Using the positioning methods described herein, the one or more unmanned aerial vehicles may travel to a position for projection of the modified projection image onto the projection surface. The one or more unmanned aerial vehicles may be configured to project the modified projection image onto the projection surface. The projection may be performed by a single unmanned aerial vehicle, or by a plurality of unmanned aerial vehicles. The projection may be performed in a direction perpendicular or normal to the projection surface. The projection may be performed at any angle between 0° and 180° relative to the projection surface.

When the modified projection image is projected onto the projection surface, the modified projection image, when viewed with respect to the irregularity of the projection surface, may appear to an observer as an unmodified projection image. For construction purposes, this may create a truer or more readily appreciable depiction of the construction plans relative to the geography of the construction site. Where the projection images a construction plan, projection of the projection image in the way described herein may allow for physical marking of the construction site, such that physical indications of the construction plans are placed within the projection surface with the option of remaining after termination of the projection.

On a practical level, projection of the modified projection image onto the uneven projection surface may allow for plans of a construction site to be more accurately projected onto an uneven construction site surface, and thereby allow markings of the construction plans to be placed in, on, or near the ground to denote features of the construction or the construction project. This may eliminate the need for some or all of the lengthy surveying processes, which are currently a mainstay of a construction project. This may represent a significant time and cost savings in comparison to the conventional method of carrying out a construction project.

An area of projection may be dependent on the type of projector used, the distance between the projector and the projection surface, and any obstructions of the projection. However, according to one aspect of the disclosure, a single unmanned aerial vehicle equipped with a laser projector may project the modified projection image onto approximately 500 m² of projection surface. In the event that the projection surface is larger than the maximum amount projectable by a given unmanned aerial vehicle, the projection image may be projected among a plurality of unmanned aerial vehicles so as to expand our range of projection surface.

According to another aspect of the disclosure, a single unmanned aerial vehicle may be equipped with multiple projectors. The multiple projectors may permit a single unmanned aerial vehicle to project on a larger projection surface than would otherwise be possible by a single projector. In this case, the one or more processors may be configured to divide the projection image according to the number available projectors, and to distribute a portion of the divided projection image to the processors controlling the various projectors, for said portions to be projected in accordance with their corresponding location data, such as global positioning system coordinates.

According to another aspect of the disclosure, the unmanned aerial vehicles may be configured to receive a modular and/or exchangeable payload for projection of said images. That is, the unmanned aerial vehicles may be equipped with a modular connection to connect one or more projectors, one or more image sensors, one or more heat cameras, one or more obstacle avoidance modules, or otherwise.

The one or more unmanned aerial vehicles may include a memory which is configured to store at least one of one or more images of the projection surface; one or more portions of the projection image; one or more portions of the modified projection image; an entire projection image; an entire modified projection image; one or more position coordinates corresponding to the projection surface, the projection image a construction plan, or otherwise; and any combination thereof.

The image sensor may be any kind of image sensor without limitation, including, but not limited to, a mono camera, a stereo camera, a depth camera, a still camera, a video camera, an infrared camera, a heat sensing camera, a night vision camera a LIDAR, or any combination thereof.

According to one aspect of the disclosure, the one or more processors as described herein are located on or within one or more unmanned aerial vehicles. The one or more processors may be configured to perform at least any of logical operations, image manipulation, or to control one or more modules including a modem, a transceiver, a camera, a projector, or otherwise.

The following examples pertain to various aspects of the disclosure:

In Example 1, an unmanned aerial vehicle is disclosed comprising a memory, configured to store a projection image; an image sensor, configured detect image data of a projection surface within a vicinity of the unmanned aerial vehicle; one or more processors, configured to: determine a depth information for a plurality of points in the detected image data; generate a transformed projection image from a projection image by modifying the projection image to compensate for unevenesses in the projection surface according to the determined depth information; send the transformed projection image to an image projector; and an image projector, configured to project the transformed projection image onto the projection surface.

In Example 2, the unmanned aerial vehicle of Example 1 is disclosed, wherein the one or more processors are configured to determine the depth information by executing instructions to detect the depth information from a comparison of images.

In Example 3, the unmanned aerial vehicle of Example 1 is disclosed, wherein the one or more processors are configured to determine the depth information by executing one or more stereo matching algorithms.

In Example 4, the unmanned aerial vehicle of Example 1 is disclosed, wherein the one or more processors are configured to determine the depth information by executing one or more stereo disparity algorithms.

In Example 5, the unmanned aerial vehicle of any one of Examples 1 to 4 is disclosed, further comprising a position sensor, configured to receive position information corresponding to a position of the unmanned aerial vehicle.

In Example 6, the unmanned aerial vehicle of Example 5 is disclosed, wherein the image sensor is configured to detect image data of the projection surface from a predetermined position according to the position sensor.

In Example 7, the unmanned aerial vehicle of Example 5 or 6 is disclosed, wherein the one or more processors are configured to send the transformed projection image to the image projector upon the unmanned area vehicle reaching a predetermined position according to the position sensor.

In Example 8, the unmanned aerial vehicle of any one of Examples 5 to 7 is disclosed, wherein the image projector is configured to project the transformed projection image from the predetermined position according to the position sensor.

In Example 9, the unmanned aerial vehicle of any one of Examples 5 to 8 is disclosed, wherein the position sensor is configured to receive position information from at least one of a global navigation satellite system, a Global Positioning System, a real time kinematic Global Positioning System, a local positioning system, a mobile communication device positioning system, or any combination thereof.

In Example 10, the unmanned aerial vehicle of any one of Examples 1 to 9 is disclosed, wherein the image sensor is at least one of a still camera, a video camera, a stereoscopic camera, a three-dimensional camera, an infrared camera, a LIDAR sensor, or a RADAR sensor.

In Example 11, the unmanned aerial vehicle of any one of Examples 1 to 10 is disclosed, wherein the one or more processors are further configured to determine a projection angle of the image projector relative to the projection surface.

In Example 12, the unmanned aerial vehicle of Example 11 is disclosed, wherein the one or more processors are further configured to generate the transformed projection image based on the projection angle.

In Example 13, the unmanned aerial vehicle of any one of Examples 1 to 12 is disclosed, wherein the projection surface is an uneven surface.

In Example 14, the unmanned aerial vehicle of any one of Examples 1 to 13 is disclosed, wherein the image projector is a laser.

In Example 15, the unmanned aerial vehicle of any one of Examples 1 to 14 is disclosed, further comprising a plurality of image projectors is disclosed, wherein each image projector comprises a laser, and wherein each laser projects a portion of the transformed projection image.

In Example 16, a system for unmanned aerial vehicle projection is disclosed comprising an unmanned aerial vehicle, comprising an image sensor, configured to detect image data; a transceiver, configured to transmit detected image data and receive a transformed projection image; and an image projector, configured to project a transformed projection image onto the projection surface; a processing station comprising a transceiver, configured to receive the detected image data and to transmit the transformed projection image; and one or more processors, configured to generate the transformed projection image by executing instructions to modify the projection image to generate the transformed projection image, such that transformed projection image resembles the projection image when projection onto the projection surface.

In Example 17, the system of Example 16 is disclosed, wherein the unmanned aerial vehicle further comprises one or more processors, configured to determine a depth information for a plurality of points in the detected image data; wherein the transceiver of the unmanned aerial vehicle is further configured to transmit the depth information, the transceiver of the processing station is further configured to receive the depth information; and the one or more processors of the processing station are further configured to generate the transformed projection image using the depth information.

In Example 18, the system of Example 16 is disclosed, wherein the one or more processors of the processing station are further configured to determine a depth information for a plurality of points in the detected image data and to generate the transformed projection image using the depth information.

In Example 19, the system of any one of Examples 16 to 18 is disclosed, wherein the one or more processors are configured to determine the depth information by executing instructions to detect depth information from a comparison of images.

In Example 20, the system of any one of Examples 16 to 18 is disclosed, wherein the one or more processors are configured to determine the depth information by executing one or more stereo matching algorithms.

In Example 21, the system of any one of Examples 16 to 18 is disclosed, wherein the one or more processors are configured to determine the depth information by executing one or more stereo disparity algorithms.

In Example 22, the system of any one of Examples 16 to 21 is disclosed, wherein the unmanned vehicle further comprises a position sensor, configured to receive position information corresponding to a position of the unmanned aerial vehicle.

In Example 23, the system of Example 22 wherein the image sensor is configured to detect image data of the projection surface from a predetermined position according to the position sensor.

In Example 24, the system of Example 22 or 23 is disclosed, wherein the one or more processors of the unmanned aerial vehicle are configured to send the transformed projection image to the image projector upon the unmanned area vehicle reaching a predetermined position according to the position sensor.

In Example 25, the system of any one of Examples 17 to 24 is disclosed, wherein the image projector is configured to project the transformed projection image from the predetermined position according to the position sensor.

In Example 26, the system of any one of Examples 17 to 25 is disclosed, wherein the position sensor is configured to receive position information from at least one of a global navigation satellite system, a Global Positioning System, a real time kinematic Global Positioning System, a local positioning system, a mobile communication device positioning system, or any combination thereof.

In Example 27, the system of any one of Examples 17 to 26 is disclosed, wherein the image sensor is at least one of a still camera, a video camera, a stereoscopic camera, a three-dimensional camera, an infrared camera, a LIDAR sensor, or a RADAR sensor.

In Example 28, the system of any one of Examples 17 to 27 is disclosed, wherein the one or more processors of the processing station are further configured to determine a projection angle of the image projector relative to the projection surface.

In Example 29, the system of Example 28 is disclosed, wherein the one or more processors of the processing station are further configured to generate the transformed projection image based on the projection angle.

In Example 30, the system of any one of Examples 17 to 29 is disclosed, wherein the one or more processors are configured to generate a transformed projection image from a projection image by using a projection mapping algorithm.

In Example 31, the system of any one of Examples 17 to 30 is disclosed, wherein the image projector is a laser.

In Example 32, the system of any one of Examples 17 to 31 is disclosed, further comprising a plurality of image projectors is disclosed, wherein each image projector comprises a laser, and wherein each laser projects a portion of the transformed projection image.

In Example 33, a method of unmanned aerial vehicle projection is disclosed comprising storing a projection image; detecting image data of a projection surface; determining a depth information for a plurality of points in the detected image data; generating a transformed projection image from a projection image by modifying the projection image to compensate for unevenesses in the projection surface according to the determined depth information; sending the transformed projection image to an image projector; and projecting the transformed projection image onto the projection surface.

In Example 34, the method of Example 33 is disclosed, further comprising determining the depth information by executing instructions to detect depth information from a comparison of images.

In Example 35, the method of Example 33 or 34 is disclosed, further comprising determining the depth information by executing one or more stereo matching algorithms.

In Example 36, the method of any one of Examples 33 to 35 is disclosed, further comprising determining the depth information by executing one or more stereo disparity algorithms.

In Example 37, the method of any one of Examples 35 to 36 is disclosed, further comprising receiving position information corresponding to a position of the unmanned aerial vehicle.

In Example 38, the method of Example 37 is disclosed, further comprising detecting image data of the projection surface from a predetermined position according to the position sensor.

In Example 39, the method of Example 37 or 38 is disclosed, further comprising sending the transformed projection image to the image projector upon the unmanned area vehicle reaching a predetermined position according to the position sensor.

In Example 40, the method of any one of Examples 37 to 39 is disclosed, further comprising projecting the transformed projection image from the predetermined position according to the position sensor.

In Example 41, the method of any one of Examples 37 to 40 is disclosed, further comprising receiving position information from at least one of a global navigation satellite system, a Global Positioning System, a real time kinematic Global Positioning System, a local positioning system, a mobile communication device positioning system, or any combination thereof.

In Example 42, the method of any one of Examples 37 to 41 is disclosed, further comprising generating the transformed projection image based on the projection angle.

In Example 43, the method of any one of Examples 37 to 42 is disclosed, wherein the projection surface is an uneven surface.

In Example 44, the method of any one of Examples 37 to 43 is disclosed, further comprising projecting the transformed projection image with a laser.

In Example 45, a non-transient computer readable medium is disclosed, configured to cause one or more processors to perform the method of storing a projection image; detecting image data of a projection surface; determining a depth information for a plurality of points in the detected image data; generating a transformed projection image from a projection image by modifying the projection image to compensate for unevenesses in the projection surface according to the determined depth information; sending the transformed projection image to an image projector; and projecting the transformed projection image onto the projection surface.

In Example 46, a means for unmanned aerial vehicle surface projection is disclosed comprising a storage means, configured to store a projection image; an image receiving means, configured detect image data of a projection surface within a vicinity of the unmanned aerial vehicle; one or more processing means, configured to: determine a depth information for a plurality of points in the detected image data; generate a transformed projection image from a projection image by modifying the projection image to compensate for unevenesses in the projection surface according to the determined depth information; send the transformed projection image to an image projector; and an image projecting means, configured to project the transformed projection image onto the projection surface.

In Example 47, the means for unmanned aerial vehicle surface projection of Example 46 is disclosed, wherein the one or more processing means are configured to determine the depth information by executing instructions to detect the depth information from a comparison of images.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:
1. An unmanned aerial vehicle comprising:
   a memory, configured to store a projection image;
   a position sensor, configured to receive position information corresponding to a position of the unmanned aerial vehicle;
   an image sensor, configured detect image data of a projection surface from a predetermined position according to the position sensor;
   one or more processors, configured to:
      determine a depth information for a plurality of points in the detected image data;
      generate a transformed projection image from a projection image by modifying the projection image to compensate for unevennesses in the projection surface according to the determined depth information;
send the transformed projection image to an image projector; and
an image projector, configured to project the transformed projection image onto the projection surface; wherein the one or more processors are configured to determine the depth information by executing one or more stereo matching algorithms and/or one or more stereo disparity algorithms.

2. The unmanned aerial vehicle of claim 1, wherein the one or more processors are configured to send the transformed projection image to the image projector upon the unmanned area vehicle reaching a predetermined position according to the position sensor.

3. The unmanned aerial vehicle of claim 1, wherein the image projector is configured to project the transformed projection image from the predetermined position according to the position sensor.

4. The unmanned aerial vehicle of claim 1, wherein the position sensor is configured to receive position information from at least one of a global navigation satellite system, a Global Positioning System, a real time kinematic Global Positioning System, a local positioning system, a mobile communication device positioning system, or any combination thereof.

5. The unmanned aerial vehicle of claim 1, wherein the image sensor is at least one of a still camera, a video camera, a stereoscopic camera, a three-dimensional camera, an infrared camera, a LIDAR sensor, or a RADAR sensor.

6. The unmanned aerial vehicle of claim 1, wherein the one or more processors are further configured to determine a projection angle of the image projector relative to the projection surface.

7. The unmanned aerial vehicle of claim 6, wherein the one or more processors are further configured to generate the transformed projection image based on the projection angle.

8. The unmanned aerial vehicle of claim 1, wherein the projection surface is an uneven surface.

9. The unmanned aerial vehicle of claim 1, wherein the image projector is a laser.

10. The unmanned aerial vehicle of claim 1, further comprising a plurality of image projectors, wherein each image projector comprises a laser, and wherein each laser projects a portion of the transformed projection image.

11. The unmanned aerial vehicle of claim 1, wherein detecting image data of the projection surface comprises obtaining a plurality of images from a variety of at least one of altitudes, directions, and angles, and wherein determining the depth information for the plurality of points in the detected image data comprises determining the depth information based at least on differences in the plurality of images based on the variety of at least one of altitudes, directions, and angles; and wherein the plurality of images are obtained via the image sensor.

12. The unmanned aerial vehicle of claim 1, wherein determining the depth information for the plurality of points in the detected image data comprises determining depth information based on a comparison two or more images of the projection surface.

13. The unmanned aerial vehicle of claim 12, wherein generating the transformed projection image comprises modifying the projection image based on the determined depth information from the comparison of the two or more images of the projection surface.

14. The unmanned aerial vehicle of claim 1, wherein the one or more processors are further configured to modify a color of the projection image to maintain visibility based on a color of the projection surface.

15. A system for unmanned aerial vehicle projection comprising:
an unmanned aerial vehicle, comprising:
a position sensor, configured to receive position information corresponding to a position of the unmanned aerial vehicle;
an image sensor, configured to detect image data of a projection surface from a predetermined position according to the position sensor;
a transceiver, configured to transmit detected image data and receive a transformed projection image; and
an image projector, configured to project a transformed projection image onto the projection surface;
a processing station comprising:
a transceiver, configured to receive the detected image data and to transmit the transformed projection image; and
one or more processors, configured to generate the transformed projection image by executing instructions to modify the projection image to generate the transformed projection image, such that transformed projection image resembles the projection image when projection onto the projection surface;
wherein transforming the projection images comprises determining a depth information for a plurality of points in the detected image data based on a comparison two or more images of the projection surface; and modifying the projection image based on the determined depth information from the comparison of the two or more images of the projection surface.

16. The system of claim 15, wherein the unmanned aerial vehicle further comprises one or more processors, configured to determine a depth information for a plurality of points in the detected image data; wherein the transceiver of the unmanned aerial vehicle is further configured to transmit the depth information, the transceiver of the processing station is further configured to receive the depth information; and the one or more processors of the processing station are further configured to generate the transformed projection image using the depth information.

17. The system of claim 16, wherein the one or more processors of the processing station are further configured to determine a depth information for a plurality of points in the detected image data and to generate the transformed projection image using the depth information.

18. A method of unmanned aerial vehicle projection, the method comprising:
storing a projection image;
detecting image data of a projection surface;
determining a depth information for a plurality of points in the detected image data;
generating a transformed projection image from a projection image by modifying the projection image to compensate for unevennesses in the projection surface according to the determined depth information;
sending the transformed projection image to an image projector; and
projecting the transformed projection image onto the projection surface.

19. The method of claim 18, further comprising determining the depth information by executing instructions to detect depth information from a comparison of images.

20. The method of claim 18, further comprising generating the transformed projection image based on the projection angle.

\* \* \* \* \*